May 9, 1961 F. A. GILL 2,983,217
COFFEE MAKER AND BREWER
Filed May 17, 1960 2 Sheets-Sheet 2

INVENTOR.
FERDINAND A. GILL
BY Threedy & Threedy
HIS ATTORNEYS.

United States Patent Office 2,983,217
Patented May 9, 1961

2,983,217

COFFEE MAKER AND BREWER

Ferdinand A. Gill, 7849 N. Keeler, Skokie, Ill.

Filed May 17, 1960, Ser. No. 29,669

7 Claims. (Cl. 99—294)

This invention relates to certain new and useful improvements in a coffee maker and brewer and has for an object the provision of a coffee maker and brewer which will be highly efficient in use and economical in manufacture.

Another object of the invention is the provision of an arrangement for passing the boiling water and/or steam through a suitable filter before it is delivered to the coffee ingredient cup.

Another and equally important object of the invention is the provision of regulating the amount of steam which is delivered to the coffee ingredient cup, thereby providing an arrangement for increasing or decreasing the strength of the coffee.

Yet another object of the coffee maker and brewer is to provide an arrangement so that the parts are arranged with respect to each other in a manner such that they may be easily and quickly disassembled for the purpose of cleansing and for the purpose of replacement of the filter.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 3 is a sectional detail view taken substantially on line 3—3 of Fig. 1;

Fig. 4 is a sectional detail view taken substantially on line 4—4 of Fig. 3;

Fig. 5 is a sectional detail view taken substantially on line 5—5 of Fig. 3;

Fig. 6 is a fragmentary elevational view taken substantially on line 6—6 of Fig. 5;

Figure 1:
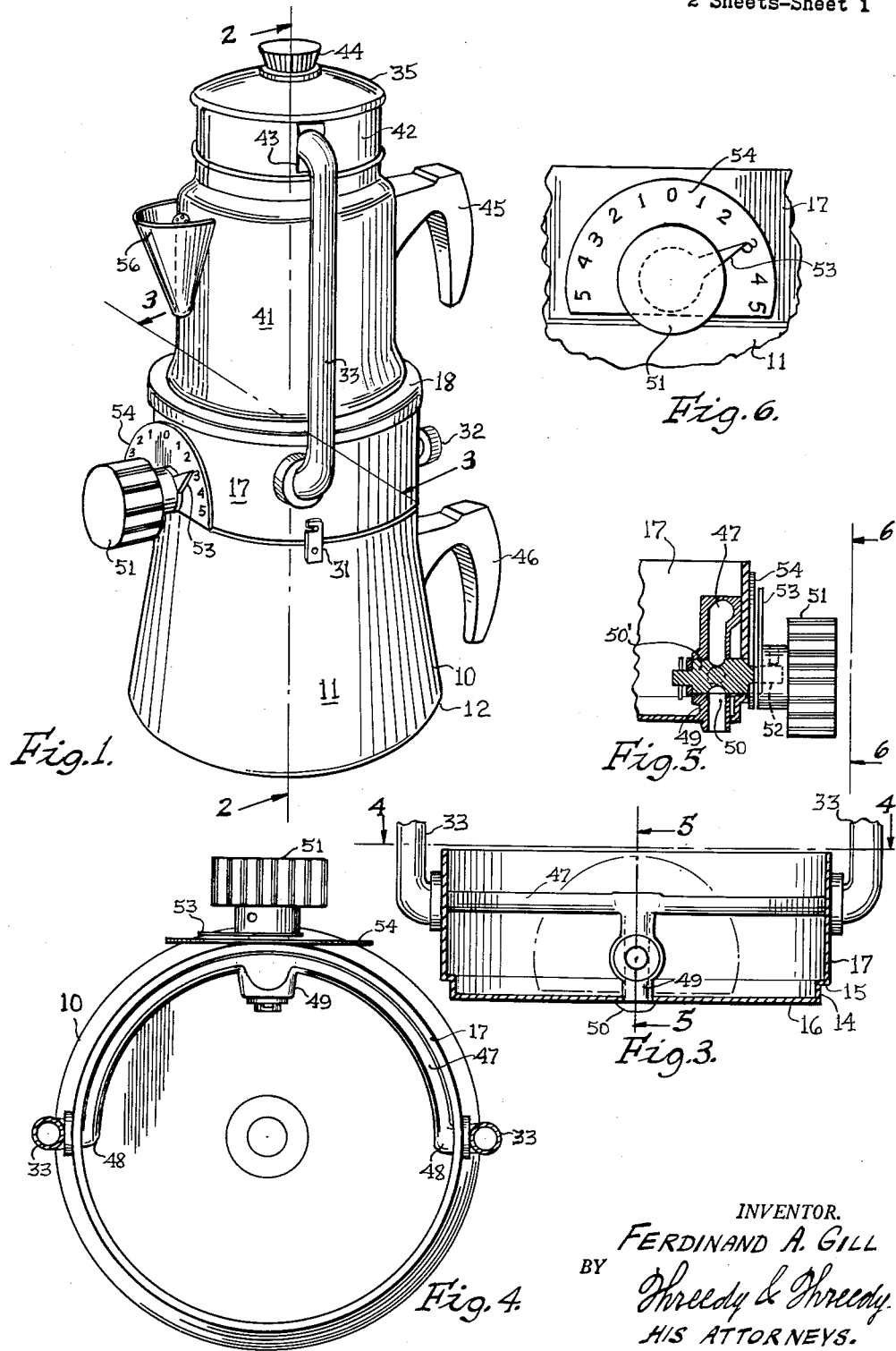
Fig. 1 is a perspective view of the invention.

Referring now particularly to the drawings showing the preferred form of construction, 10 indicates a water container constituting the base of my improved coffee maker and brewer. This container 10 may be formed of such material as will best serve the purpose and in the preferred form of construction the side walls 11 of the container 10 are flared outwardly to provide an enlarged base 12 which, by reason of its size, will tend to prevent tilting of the coffee maker and brewer.

The upper open portion of the container 10 is closed by the bottom wall 16 of a removable filter cup 17. The side walls of the filter cup 17 have a reduced portion 14 removably fitting into the upper end portion of the container 10, the peripheral edge 15 of the filter cup 17 extending over and on top of the edge of the open end portion of the container 10. If required, a seal of any desired and approved construction may be provided between the peripheral edge 15 and the edge of the open end portion of the container 10 so as to prevent escape of steam or hot water. Such a seal may be in the form of a gasket ring or the like.

The filter cup 17 provides a removable top cover plate 18 which has projected therethrough a bolt 19, the head 20 of which is positioned in a recess 21 provided by the top cover plate 18 and a bushing 22 secured thereto and through which the bolt 19 passes.

Formed as an integral part of the bottom wall 16 of the filter cup 17 is a depending tube 25 which extends into the container 10 with its lower end portion 26 a predetermined distance from the bottom wall 12 of the container 10, the upper portion of the tube 25 being internally threaded. The bolt 19 has a threaded portion 22' which is threaded into the tube 25. The arrangement is such that when the bolt 19 is unthreaded from the tube 25, the filter cup cover 18 may be removed from the container 10.

Figures 2, 7:
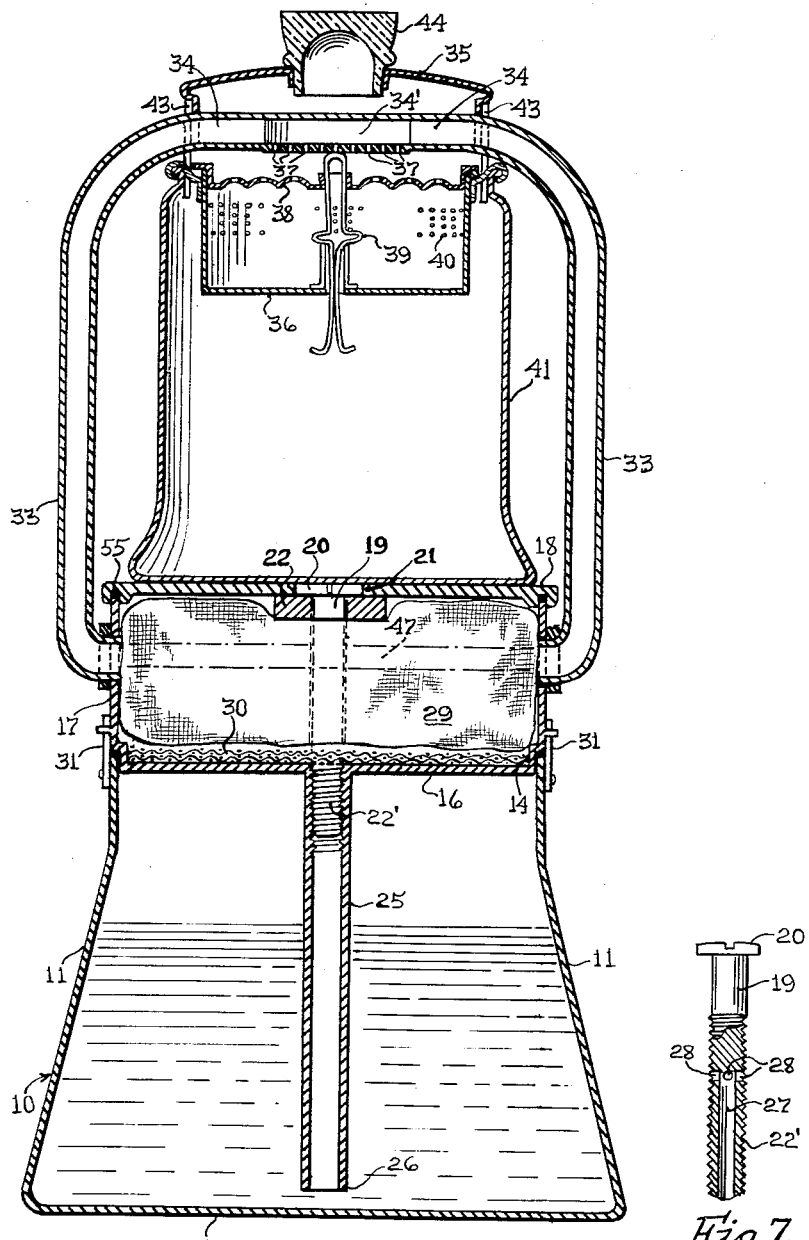
Fig. 2 is a sectional detail view taken substantially on line 2—2 of Fig. 1.
Fig. 7 is an elevational view partly in section of a bolt embodied in my invention.

The bolt 19 is of a partially hollow construction as shown at 27 (Fig. 7) and has formed therein radially extending openings 28 communicating with the hollow portion of the bolt 27. The arrangement is such that hot water rising up the tube 25 will pass into the hollow portion 27 of the bolt 19 and flow out through the openings 28 into the filter cup 17.

Arranged within the filter cup 17 is a filter element 29 of any approved construction. The filter element 29 is positioned upon a screen structure 30 which serves to space the filter element 29 from the bottom of the filter cup 17 to permit the free flow of hot water over the bottom wall 16 of the filter cup 17.

The filter cup 17 is detachably connected to the water container 10 by a slotted bar and pin arrangement 31 secured on opposite sides of the water container 10 and filter cup 17. To remove the filter cup 17, the cup may be slightly rotated relative to the container 10 until the pins disengage from the slots of the connections 31. Rotation of such filter cup 17 may be facilitated by a suitable hand knob 32 secured thereto.

Extending from and communicating with the container cup 17 on opposite diametrical sides thereof are tubes 33, the upper end portions 34 of which terminate in a disc-like formation 34' disposed within a cap 35 over an ingredient container cup 36. The portion 34' of such tubes 33 is perforated as at 37 to permit the hot water or steam to pass into the coffee ingredient cup 36 through a suitable perforated movable cover 38. The cover 38 carries a handle element 39 which freely extends through the bottom of the cup 36. When extended upward therefrom, the lower end of the handle element 39 engages the bottom of the cup to facilitate removal of the cup 36. The cup 36 has its side walls perforated as at 40 to permit the coffee brew to pass into the coffee dispenser pot 41, which pot 41 rests upon the filter cup 17.

The side walls 42 of the cap 35 on opposite diametrical sides thereof are provided with slots 43 for the reception of the adjacent portions of the tubes 33. The cap 35 is provided with a suitable hand knob 44 to facilitate removal of the cap from the pot 41 for purposes later described. The pot 41 and water container 10 are provided with suitable handles 45 and 46 respectively.

Arranged within the filter cup 17 and extending along a side wall thereof (Figs. 3 and 4) is a tube 47, the ends 48 of which communicate with the adjacent tubes 33. Communicating with the tube 47 at a point substantially midway between its opposite end portions is a depending duct 49 which communicates as at 50 with the upper portion of the water container 10.

Controlling the passage through the duct 49 is a valve 50' operated by a hand knob 51 carried by the shaft 52 of the valve 50'. By rotation of the valve 50', the passage through the duct 49 may be restricted so as to limit the amount of steam passing therethrough from the water container 10. The position of the valve 50' may be indicated by a pointer 53 and a gauge plate 54 as seen in Figs. 1, 5 and 6. The top wall 18 is provided with a suitable seal 55 so as to prevent escape of steam or hot water from the filter cup 17.

Within the container 10 may be arranged a suitable electric heating unit (not shown) or, in the event such unit is not provided, in making the coffee brew the water within the container 10 may be heated to a boiling point by placement of the coffee maker over a gas burner or electric heating element. When the pressure within the container 10 reaches a predetermined degree, the hot water will pass up the tube 25 into the filter cup 17, passing through the filter element 29, and thence up through the tubes 33 from whence, through the portion 34', the hot water passes into the coffee ingredient cup 40 and the coffee brew passes through such cup into the dispenser pot 41.

After the coffee brewing operation has been completed, the cap 35 is removed and by means of the handle 45 the coffee pot 41 may be removed from beneath the tube formation 34' and lifted from its position on top of the filter cup 17. The brewed coffee may then be poured from the coffee pot 41 through the spout 56 to dispense the same.

Should it be desired to increase the strength of the coffee brew, that is, by admission of a greater amount of steam directly into the brewing cup 36, this may be accomplished by opening of the valve 50, in which case steam by-passes the filter, going directly through the tube 47, up through the tubes 33, and thence into and through the brewing cup 36. The amount of steam to be directly admitted to the brewing cup is governed by the adjustment of the valve 50.

The advantages of my improved coffee maker and brewer will be self-evident from the foregoing description. The size of the coffee maker may vary according to the requirements.

From the foregoing description, it will be apparent that unlike coffee makers which are presently on the market, I provide an arrangement for passing the boiling water first through a filter before it enters the coffee brewing cup. Such an arrangement results in the removal from the water of impurities, foreign matter, and unpleasant taste properties, before the water reaches the point where it is discharged into the brewing cup 36.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A coffee maker and brewer comprising a water container, a filter cup mounted thereon, means providing communication between the filter cup and the container, a coffee pot on the filter cup, means providing communication between the filter cup and the coffee pot, a brewing cup at the point of communication between the filter cup and the coffee pot, and a branch tube within the filter cup and communicating with the water container at the upper portion thereof and with the brewing cup for the passage of steam directly from the water container to the brewing cup.

2. A coffee maker and brewer comprising a water container, a filter cup mounted thereon, means providing communication between the filter cup and the container, a coffee pot on the filter cup, means providing communication between the filter cup and the coffee pot, a brewing cup at the point of communication between the filter cup and the coffee pot, a branch tube within the filter cup and communicating with the water container at the upper portion thereof and with the brewing cup for the passage of steam directly from the water container to the brewing cup, and a valve in said branch tube for varying the passage of the amount of steam therethrough.

3. A coffee maker and brewer comprising a water container, a filter cup mounted thereon and having a tube extending downwardly therefrom into said water container with its end portion spaced from the bottom wall of said container, a bolt connection between said filter cup and said water container, said bolt connection having a tubular portion extending into said tube and provided with radially disposed openings opening communication between said tubular portion and said filter cup, a coffee pot on the filter cup, means providing communication between the filter cup and the coffee pot, and a perforated brewing cup within said coffee pot at the point of communication between the filter cup and the coffee pot.

4. The device of claim 3 further including a branch communication directly from the water container to the brewing cup.

5. The device of claim 3 further including a branch communication directly from the water container to the brewing cup and means for restricting the passage through said branch communication.

6. The device of claim 3 further including a branch tube within the filter cup and communicating with the water container at the upper portion thereof and with the brewing cup for the passage of steam directly from the water container to the brewing cup.

7. The device defined by claim 3 including a branch tube within the filter cup and communicating with the water container at the upper portion thereof and with the brewing cup for the passage of steam directly from the water container to the brewing cup, and a valve in said branch tube for varying the passage of the amount of steam therethrough.

References Cited in the file of this patent

UNITED STATES PATENTS

| | | |
|---|---|---|
| 96,558 | Dodge | Nov. 9, 1869 |
| 1,474,858 | Strohbach | Nov. 20, 1923 |